United States Patent
Nakakawaji et al.

(10) Patent No.: US 6,296,917 B1
(45) Date of Patent: *Oct. 2, 2001

(54) MAGNETIC DISK AND MAGNETIC RECORDING/REPRODUCTION APPARATUS

(75) Inventors: Takayuki Nakakawaji, Kitaibaraki; Mitsuyoshi Shouji, Jyuou-machi; Tomoe Takamura, Hitachi; Hiroshi Sasaki, Tokai-mura; Shuji Imazeki, Hitachi; Yutaka Ito, Takahagi, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,711
(22) PCT Filed: Oct. 18, 1995
(86) PCT No.: PCT/JP95/02132
  § 371 Date: Apr. 17, 1998
  § 102(e) Date: Apr. 17, 1998
(87) PCT Pub. No.: WO97/15049
  PCT Pub. Date: Apr. 24, 1997

(51) Int. Cl.[7] .................................................. G11B 5/725
(52) U.S. Cl. .................. 428/65.4; 428/141; 428/65.5; 428/694 TC; 428/694 TF; 428/695; 428/900; 428/421; 428/422; 428/408
(58) Field of Search .................. 427/548, 130, 427/127, 599, 502, 131, 553, 557; 428/64.2, 65.3, 65.4, 65.5, 65.8, 694 BF, 694 BR, 695, 694 TC, 694 TF, 421, 422, 408, 141, 900; 505/171

(56) References Cited

U.S. PATENT DOCUMENTS

| 4,849,305 |   | 7/1989 | Yanagisawa . |
| 5,049,410 | * | 9/1991 | Johary et al. .................. 427/131 |
| 5,143,787 | * | 9/1992 | Frew et al. ..................... 428/408 |
| 5,871,621 | * | 2/1999 | Ross ............................ 204/192.2 |

FOREIGN PATENT DOCUMENTS

| 0338529A3 |   | 10/1989 | (EP) . |
| 505303 |   | 9/1992 | (EP) . |
| 03-93037 | * | 4/1991 | (JP) . |
| 04-311812 | * | 11/1992 | (JP) . |

OTHER PUBLICATIONS

Patent Abstracts of Japan, Publication No. 05217159, Publication Date–Aug. 27, 1993.

(List continued on next page.)

*Primary Examiner*—Stevan A. Resan
(74) *Attorney, Agent, or Firm*—Antonelli, Terry, Stout & Kraus, LLP

(57) ABSTRACT

A lubricating film is provided for a magnetic disk having a data region and a CSS region formed on its surface. The lubricating film ensures low stiction and good resistance to contact sliding in the data region and also ensures good CSS durability in the CSS region. Therefore, it is possible to provide a magnetic disk and a magnetic recording/reproducing device which do not cause problems with sliding between the magnetic head and the magnetic disk while the apparatus is running normally and even when the apparatus stops accidentally. The lubricating film formed in the data region of the magnetic disk is firmly fixed to the surface of the magnetic disk and is hardly liable to stiction. In addition, it is thick enough to ensure good durability even in the case of contact sliding. The lubricating film formed in the CSS region is composed of a lubricant which is firmly fixed to the surface of the magnetic disk and another lubricant which is weakly fixed to the surface of the magnetic disk; therefore, it is superior in CSS durability. This contributes to the highly reliable magnetic disk and magnetic recording/reproducing device.

15 Claims, 3 Drawing Sheets

OTHER PUBLICATIONS

Patent Abstracts of Japan, Publication No. 06111292, Publication Date–Apr. 22, 1994.

Patent Abstracts of Japan, Publication No. 04053027, Publication Date–Feb. 20, 1992.

Lee H.J., et al., "Enhanced Tribological Performance of Rigid Disk by Using Chemically Bonded Lubricant", *1992 Digests of INTERMAG '92,* Apr. 1992, p. DB02.

"Method to Increase Lubricant Bonding on Thin Films Disks", *IBM Technical Disclosure Bulletin,* vol. 38, No. 4, Apr. 1, 1995, p. 511.

* cited by examiner

MAGNETIC DISK AND MAGNETIC RECORDING/REPRODUCTION APPARATUS

TECHNICAL FIELD

The present invention relates to a magnetic disk and a magnetic recording/reproducing device and, more particularly, to a magnetic disk and a magnetic recording/reproducing device characterized by a high recording density.

BACKGROUND OF THE INVENTION

The continuing development of the magnetic recording/reproducing device of the hard disk type is following the trend toward reduction in the diameter of the magnetic disk, reduction in the size and weight of the apparatus, and an increase in recording density. The higher the recording density of the magnetic disk becomes, the smaller is the distance (or flying height) between the magnetic disk and the magnetic head. It is expected in the near future that recording and reproducing will be accomplished in such a manner that the magnetic head is in complete contact with the magnetic disk. Then, the magnetic disk will be subject to a much severe sliding condition. On the other hand, an increase in recording density needs a smaller flying height and a smoother magnetic disk surface (for stable flying). The consequence is that the head slider (supporting the magnetic head) slides on (keeping in contact with) the magnetic disk for a longer period of time than before (sliding in this manner is referred to as contact sliding hereinafter), the disk is subject to more dynamic friction and wear than before during its start-up, and there occurs a limiting static friction (referred to as stiction hereinafter) between the head and the disk. The result of an increase in the dynamic friction and wear due to contact sliding is an occasional disk crash and head wear which tends to disable recording and reproducing operations. Moreover, strong stiction disables the start-up of the disk and damages the disk head.

In order to address the above-mentioned problems, there has been developed a magnetic disk of a new type which has two separate regions: one in which the head slider stands by when the magnetic disk is at rest and experiences contact start and contact stop when the disk starts and stops, and the other in which the head performs recording and reproducing while the disk is running. The former region is referred to as CSS region and the latter as a data region. The CSS region is usually formed in an inner section of the magnetic disk and it has its surface roughened so as to prevent stiction. By contrast, the data region has its surface smoothed so as to ensure a stable head floating. The magnetic disk having a CSS region and data region needs a special lubricating film and lubricating technologies. For example, Japanese Patent Laid-open No. 36277/1994 discloses a method of preventing stiction by forming a protuberance (about 5 nm high) on the rail surface of the slider in the CSS region. Also, Japanese Patent Laid-open No. 111292/1994 discloses the use of a liquid lubricant in the CSS region and a solid lubricant in the data region. These prior art technologies are directed to the lubricating film to be applied to the magnetic disk in which are formed the CSS region and data region, and the lubricating film realizes to some extent the sliding characteristics required of the CSS region and data region. There is a distinct difference in requirements between the lubricating film for the CSS region and the lubricating film for the data region because the head-disk sliding state differs in these two regions. In the CSS region, it is possible to somewhat reduce stiction by roughening the surface of the magnetic disk, but there is a need for a lubricating film with good durability because contact sliding takes place when the disk starts up and stops. In the data region, however, it is necessary that the disk have a small surface roughness and the lubricating film have a low stiction. The reason for this is that the head slider could come into contact with the data region (causing strong stiction) when the disk stops suddenly (due to some anomaly) while the head slider lies in the data region. Therefore, the lubricating film in the CSS region should differ in lubricating performance from that in the data region.

The lubricant now in use for magnetic disks is a perfluoropolyether compound having functional groups for adsorption to the disk surface. This lubricant gives rise to a lubricating film which is composed of a layer firmly adsorbed to the disk surface and a layer which is adsorbed weakly or not adsorbed to the disk surface. The firmly adsorbed lubricating layer does not separate from the disk surface when the disk is washed with a perfluorocarbon solvent. On the other hand, the weakly adsorbed lubricating layer is easily separated from the disk surface by washing. This weakly adsorbed lubricating layer, however, plays an important role in the CSS region which needs good durability, because it is necessary that the lubricant partly moves to the slide surface of the head slider at the time of sliding so that a stable frictional state is established. Without this weakly adsorbed layer in the CSS region, it is impossible to maintain satisfactory reliability. By contrast, the data region needs low stiction, because cohesion of the lubricant in the gap between the head and the disk should be avoided when the head comes into contact with the data region at the time of an anomalous sudden stop and the excessive scraping up of the lubricant by the head during seeking should be avoided. Thus, the weakly adsorbed layer, which is easily mobile on the disk surface, has an adverse effect on stiction contrary to durability. For this reason, the weakly adsorbed layer should be as little as possible. If a conventional lubricant of the adsorption type is applied to the entire surface of the disk and the data region alone is washed to remove the weakly adsorbed layer, it necessarily follows that the lubricating film in the data region decreases in thickness. At the present time, there is by far a smaller chance of contact sliding in the data region than in the CSS region; however, in the future magnetic disk apparatus in which the flying height of the head will decrease further, there will be a stronger chance of contact sliding between the head and disk even in the data region. Thus, there will be, in a near future, a demand for the data region to have good durability. This implies that the lubricating film in the data region should be thick enough to endure occasional contact sliding.

These technical problems are not solved completely by the above-mentioned prior art technologies. The technology disclosed in Japanese Patent Laid-open No. 111292/1994 provides the respective regions with the desired lubricating characteristics by coating the CSS region with a liquid lubricant and the data region with a solid lubricant. This technology suffers the disadvantage of requiring a complex process to form the lubricant films. The technology disclosed in Japanese Patent Laid-open No. 53027/1992 ensures low stiction in the data region and good durability in the CSS region by forming the lubricating films such that the lubricating film in the data region is thinner than the lubricating film in the CSS region. This technology, however, is not satisfactory because it is necessary to maintain a certain thickness for the lubricating film in the data region in order to ensure good durability. At the present time, there is no effective means to ensure satisfactory slide reliability for a disk having a CSS region and data region formed thereon.

The present invention was completed to address the above-mentioned problems involved in the prior art technology. It is an object of the present invention to provide an effective means to ensure satisfactory slide reliability for a disk having a CSS region and data region formed thereon. It is another object of the present invention to provide a high-performance magnetic disk and magnetic recording/reproducing device that employ such means.

SUMMARY OF THE INVENTION

The magnetic disk according to the present invention is characterized by the provision of lubricating layers formed thereon in a unique manner as mentioned below. In the data region in the magnetic disk, the weakly adsorbed lubricating layer is as small as possible to so as to ensure low stiction, but the lubricating film is thick enough to endure contact sliding (between the magnetic head and the magnetic disk) that might occasionally occur. This object is achieved by using a lubricant that strongly adsorbs to the surface of the magnetic disk or by treating the applied lubricant afterward. In the CSS region in the magnetic disk, a weakly adsorbed lubricating layer less liable to stiction is formed, so as to ensure satisfactory durability and take into consideration the fact that the lubricant easily moves to the head slider. The present invention discloses the magnetic disk, the process for production thereof, and the magnetic recording/reproducing device mentioned below.

The first aspect of the present invention resides in a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 rm at the place where the magnetic head slider is positioned while the magnetic disk is rotating, the protective layer being coated with a lubricating film which contains at least one member selected from perfluoropolyether compounds expressed by the formulas (I) to (III) below,

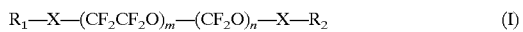

$$R_1\text{—}X\text{—}(CF_2CF_2O)_m\text{—}(CF_2O)_n\text{—}X\text{—}R_2 \qquad (I)$$

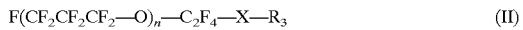

$$F(CF_2CF_2CF_2\text{—}O)_n\text{—}C_2F_4\text{—}X\text{—}R_3 \qquad (II)$$

$$F\text{—}(CF(CF_3)\text{—}CF_2\text{—}O)_n\text{—}CF(CF_3)\text{—}X\text{—}R_4 \qquad (III)$$

(where m and n are integers; $R_1$, $R_2$, $R_3$, and $R_4$ are hydrocarbon chains; and X is a divalent binding group) the lubricating film is composed of a lubricant which is firmly fixed to the surface of said protective film and another lubricant which is weakly fixed to the surface of said protective film, the lubricating film formed in the CSS region containing a lubricant which is weakly fixed in an amount not less than 10% of the total amount of the lubricant in the CSS region, the lubricating film formed in the data region containing a lubricant which is weakly fixed in an amount less than 10% of the total amount of the lubricant in the data region.

The second aspect of the present invention resides in a magnetic disk as defined in the first aspect, the magnetic disk being characterized in that the lubricating film is composed of a lubricant which is firmly fixed to the surface of the protective layer such that it is not washed out by a perfluorocarbon solvent, and another lubricant which is weakly fixed to the surface of the protective layer such that it is washed out by a perfluorocarbon solvent.

The third aspect of the present invention resides in a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated with a lubricant which contains at least one member selected from perfluoropolyether compounds expressed by the formulas (I) to (III) above, the lubricant being applied to the entire surface of the magnetic disk, the entire surface of the magnetic disk being heated above 80° C. or the entire surface or the data region being irradiated with ultraviolet rays, the CSS region being subsequently washed with a per fluorocarbon solvent, such that the lubricating film formed in the CSS region has a thickness greater than equal to 1.5 nm and the lubricating film formed in the data region has a thickness greater than or equal to 1 nm.

The fourth aspect of the present invention resides in a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while said magnetic disk is rotating, the protective layer being coated with a lubricant which contains at least one member selected from perfluoropolyether compounds expressed by the formulas (I) to (III) above, the lubricant being applied to the entire surface of the magnetic disk, the entire surface of the magnetic disk being heated above 80° C. or the entire surface or the data region being irradiated with ultraviolet rays, the entire surface of the magnetic disk being washed with a perfluorocarbon solvent, subsequently the CSS region being coated with a perfluorocarbon compound having adsorptive functional groups selected from perfluoropolyether compounds expressed by the formulas (I) to (III) above, such that the lubricating film formed in the CSS region has a thickness greater than or equal to 1.5 nm and the lubricating film formed in the data region has a thickness greater than or equal to 1 nm.

The fifth aspect of the present invention resides in a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while said magnetic disk is rotating, the protective layer being coated with a lubricant which contains at least one member selected from perfluoropolyether compounds expressed by the formulas (I) to (III)

above, the lubricant being applied to the entire surface of the magnetic disk, the entire surface of the magnetic disk being heated above 80° C. or the entire surface or the data region being irradiated with ultraviolet rays, the entire surface of the magnetic disk being washed with a perfluorocarbon solvent, subsequently the data region being coated with a perfluorocarbon compound having functional groups chemically reactive with the surface of said protective film selected from perfluoropolyether compounds expressed by the formulas (I) to (III) above, such that the lubricating film formed in the CSS region has a thickness greater than or equal to 1.5 nm and the lubricating film formed in the data region has a thickness greater than or equal to 1 nm.

The sixth aspect of the present invention resides in a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated with a lubricant which contains at least one member selected from perfluoropolyether compounds having functional groups chemically reactive with the surface of said protective film expressed by the formulas (I) to (III) above, the lubricant being applied to the entire surface of the magnetic disk, the entire surface of the magnetic disk being heated above 80° C. or the entire surface or the data region being irradiated with ultraviolet rays, the entire surface of the magnetic disk being washed with a perfluorocarbon solvent, subsequently the data region being coated with a perfluorocarbon compound having functional groups chemically reactive with the surface of said protective film selected from perfluoropolyether compounds expressed by the formulas (I) to (III) above, such that the lubricating film formed in the CSS region has a thickness greater than or equal to 1.5 nm and the lubricating film formed in the data region has a thickness greater than or equal to 1 nm.

The seventh aspect of the present invention resides in a process for producing a magnetic disk having a seed layer, a magnetic layer, a protective layer, and a lubricating layer sequentially laminated on a non-magnetic substrate, the process comprising forming the CSS region having a protective layer with a surface roughness greater than or equal to Ra 10 nm at the place where the magnetic head slider is positioned when the magnetic disk starts and stops rotating, forming the data region having a protective layer with a surface roughness smaller than equal to Ra 3 nm at the place where the magnetic head slider is positioned while the magnetic disk is rotating, coating the surface of said protective layer all over the magnetic disk with a lubricant which contains at least one member selected from perfluoropolyether compounds expressed by the formulas (I) to (III) above, heating the entire surface of the magnetic disk above 80° C. or irradiating the entire surface of the magnetic disk or the data region with ultraviolet rays, and washing the CSS region with a perfluorocarbon solvent, such that the lubricating film formed in the CSS region has a thickness greater than or equal to 1.5 nm and the lubricating film formed in the data region has a thickness greater than or equal to 1 nm.

The eighth aspect of the present invention resides in a process for producing a magnetic disk as defined in the seventh aspect, which further comprises, after washing the entire surface of the magnetic disk with a perfluorocarbon solvent, coating the CSS region with a perfluoropolyether compound having adsorptive functional groups selected from the perfluoropolyether compounds expressed by the formulas (I) to (III) above, such that the lubricating film formed in the CSS region has a thickness greater than or equal to 1.5 nm and the lubricating film formed in the data region has a thickness greater than or equal to 1 nm.

The ninth aspect of the present invention resides in a process for producing a magnetic disk as defined in the seventh aspect, which further comprises, after washing the entire surface of the magnetic disk with a perfluorocarbon solvent, applying a perfluoropolyether compound having functional groups chemically reactive with the surface of the protective film which is selected from the perfluoropolyether compounds expressed by the formulas (I) to (III) above, such that the lubricating film formed in the CSS region has a thickness greater than or equal to 1.5 nm and the lubricating film formed in the data region has a thickness greater than or equal to 1 nm.

The tenth aspect of the present invention resides in a process for producing a magnetic disk as defined in the seventh aspect, which further comprises, after heating the entire surface of the magnetic disk above 80° C. or irradiating it with ultraviolet rays, applying to the entire surface of the magnetic disk a perfluoropolyether compound-having adsorptive functional groups which is selected from the perfluoropolyether compounds expressed by the formulas (I) to (III) above, and, after washing the data region with a perfluorocarbon solvent, applying a perfluoropolyether compound having chemically reactive functional groups which is selected from perfluoropolyether compounds expressed by the formulas (I) to (III) above, such that the lubricating film formed in the CSS region has a thickness greater than or equal to 1.5 nm and the lubricating film formed in the data region has a thickness greater than or equal to 1 nm.

The eleventh aspect of the present invention resides in a magnetic recording/reproducing device composed of a magnetic head, a magnetic head slider carrying the magnetic head, and a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 rim at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated with a lubricating film which contains at least one member selected from perfluoropolyether compounds expressed by the formulas (I) to (III) above, the lubricating film is composed of a lubricant which is firmly fixed to the surface of said protective film and another lubricant which is weakly fixed to the surface of said protective film, the lubricating film formed in the CSS region containing a lubricant which is weakly fixed in an amount not less than 10% of the total amount of the lubricant in the CSS region, the lubricating film formed in the data region containing a lubricant which is weakly fixed in an amount less than 10% of the total amount of the lubricant in the data region, such that the limiting static friction, and dynamic friction that occur in the data region between the magnetic head slider and the magnetic disk are smaller than or equal to 1.5 and 1.0, respectively, and the limiting static friction and dynamic friction that occur in the CSS region between the magnetic head slider and the magnetic disk are smaller than or equal to 1.0 and 0.5, respectively.

The twelfth aspect of the present invention resides in a magnetic recording/reproducing device composed of a magnetic head, a magnetic head slider carrying the magnetic head, and a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated with a lubricating film which contains at least one member selected from perfluoropolyether compounds expressed by the formulas (I) to (III) above, the lubricant being applied to the entire surface of the magnetic disk, the entire surface of the, magnetic disk being heated above 80° C. or the entire surface or the data region being irradiated with ultraviolet rays, the CSS region being subsequently washed with a perfluorocarbon solvent, such that the lubricating film formed in the CSS region has a thickness greater than or equal to 1.5 nm and the lubricating film formed in the data region has a thickness greater than or equal to 1 nm, and the limiting static friction and dynamic friction that occur in the data region between the magnetic head slider and the magnetic disk are smaller than or equal to 1.5 and 1.0, respectively, and the limiting static friction and dynamic friction that occur in the CSS region between the magnetic head slider and the magnetic disk are smaller than or equal to 1.0 and 0.5, respectively.

The thirteenth aspect of the present invention resides in a magnetic recording/reproducing device as the twelfth aspect, which is characterized in that the magnetic disk has the data region which is coated, after washing with a fluorocarbon solvent, with a perfluoropolyether compound having adsorptive functional groups which is selected from the perfluoropolyether compounds expressed by the formulas (I) to (III) above, such that the lubricating film formed in the CSS region has a thickness greater than or equal to 1.5 nm and the lubricating film formed in the data region has a thickness greater than or equal to 1 nm.

The fourteenth aspect of the present invention resides in a magnetic recording/reproducing device as defined in the twelfth aspect, which is characterized in that the entire surface of the magnetic disk is coated, after the washing of the data region with a fluorocarbon solvent, with a perfluoropolyether compound having functional groups chemically reactive with the protective film which is selected from the perfluoropolyether compounds expressed by the formulas (I) to (III) above, such that the lubricating film formed in the CSS region has a thickness greater than or equal to 1.5 nm and the lubricating film formed in the data region has a thickness greater than or equal to 1 nm.

The fifteenth aspect of the present invention resides in a magnetic recording/reproducing device composed of a magnetic head, a magnetic head slider carrying the magnetic head, and a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, after coating the surface of the protective film all over the magnetic disk with at least one perfluoropolyether compound expressed by the formulas (I) to (III) above, heating the entire surface of the magnetic disk above 80° C. or irradiating the entire surface of the magnetic disk or the data region with ultraviolet rays, coating the entire surface of the magnetic disk with a perfluoropolyether compound having adsorptive functional groups which is selected from the perfluoropolyether compounds expressed by the formulas (I) to (III) above, and, after washing the data region with a perfluorocarbon solvent, applying a perfluoropolyether compound having chemically reactive functional groups which is selected from the perfluoropolyether compounds expressed by the formulas (I) to (III) above, such that the lubricating film formed in the CSS region has a thickness greater than or equal to 1.5 nm and the lubricating film formed in the data region has a thickness greater than 1 nm, and the limiting static friction and dynamic friction that occur in the data region between the magnetic head slider and the magnetic disk are smaller than or equal to 1.5 and 1.0, respectively, and the limiting static friction and dynamic friction that occur in the CSS region between the magnetic head slider and the magnetic disk are smaller than or equal to 1.0 and 0.5, respectively.

The sixteenth aspect of the present invention resides in a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated with a lubricant which contains at least one member selected from perfluoropolyether compounds expressed by the formulas (IV) to (XIII) below, $$F(CF_2CF_2CF_2O)_n\text{—}C_2F_4\text{—}CONH\text{—}C_3H_6\text{—}Si(OC_2H_5)_3 \quad (IV)$$

$$F(CF(CF_3)\text{—}CF_2O)_n\text{—}CF(CF_3)\text{—}CONH\text{—}C_3H_6\text{—}Si(OC_2H_5)_3 \quad (V)$$

$$(C_2H_5O)_3Si\text{—}C_3H_6\text{—}NHCO\text{—}(CF_2CF_2O)_m\text{—}(CF_2O)_n\text{—}CONH\text{—}C_3H_6\text{—}Si(OC_2H_5)_3 \quad (VI)$$

$$C_6H_5\text{—}O\text{—}C_6H_4\text{—}H_3N+\text{—}OCO\text{—}(CF_2CF_2O)_m\text{—}(CF_2O)_n\text{—}COO\text{—}+NH_3\text{—}C_6H_4\text{—}O\text{—}C_6H_5 \quad (VII)$$

$$F(CF_2CF_2CF_2\text{—}O)_n\text{—}C_2F_4\text{—}CH_2OH \quad (VIII)$$

$$HO\text{—}CH_2\text{—}(CF_2CF_2O)_m\text{—}(CF_2O)_n\text{—}CH_2OH \quad (IX)$$

$$HO\text{—}(CH_2CH_2\text{—}O)_p\text{—}CH_2CF_2\text{—}(CF_2CF_2O)_m\text{—}(CF_2O)_n\text{—}OCF_2CH_2(O\text{—}CH_2CH_2)_q\text{—}OH \quad (X)$$

$$F(CF_2CF_2CF_2O)_n\text{—}C_2F_4\text{—}COO\text{—}+NH_3\text{—}C_6H_4\text{—}O\text{—}C_6H_5 \quad (XI)$$

$$F(CF(CF_3)\text{—}CF_2O)_n\text{—}CF(CF_3)\text{—}COO\text{—}+NH_3\text{—}C_6H_4\text{—}O\text{—}C_6H_5 \quad (XII)$$

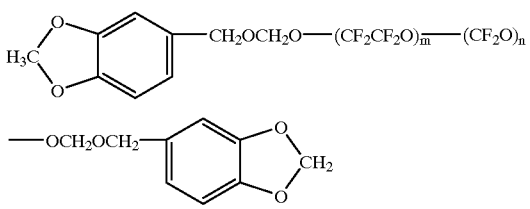

(XIII)

(where m, n, p, and q are integers) all over the surface of the magnetic disk, the entire surface of the magnetic disk being heated above 80° C. or the data region being irradiated with ultraviolet rays, the CSS region being subsequently washed with a perfluorocarbon solvent, such that the lubricating film formed in the CSS region has a thickness greater than or equal to 1.5 nm and the lubricating film formed in the data region has a thickness greater than or equal to 1 nm.

The seventeenth aspect of the present invention resides in a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated with a lubricant which contains at least one member selected from perfluoropolyether compounds expressed by the formulas (IV) to (XIII) above, all over the surface of the magnetic disk, the entire surface of the magnetic disk being heated above 80° C. or the data region being irradiated with ultraviolet rays, the entire surface of the magnetic disk being washed with a perfluorocarbon solvent and the CSS region being coated with a perfluoropolyether compound having adsorptive functional groups which is selected from the perfluoropolyether compounds expressed by the formulas (VII) to (XIII) above, such that the lubricating film formed in the CSS region has a thickness greater than or equal to 1.5 nm and the lubricating film formed in the data region has a thickness greater than 1 nm.

The eighteenth aspect of the present invention resides in a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated with a lubricant which contains at least one member selected from perfluoropolyether compounds expressed by the formulas (IV) to (XIII) above, the lubricant being applied to the entire surface of the magnetic disk, the entire surface of the magnetic disk being heated above 80° C. or the entire surface of the magnetic disk or the data region being irradiated with ultraviolet rays, the data region being subsequently washed with a perfluorocarbon solvent, and coating the data region with a perfluoropolyether compound having functional groups reactive with the surface of the protective film which is selected from the perfluoropolyether compounds expressed by the formulas (IV) to (VI) above, such that the lubricating film formed in the CSS region has a thickness greater than or equal to 1.5 nm and the lubricating film formed in the data region has a thickness greater than or equal to 1 nm.

The nineteenth aspect of the present invention resides in a magnetic disk having a seed layer, a magnetic layer, and a protective layer sequentially laminated on a non-magnetic substrate, characterized in that the disk has a CSS region and a data region, the CSS region having a protective layer with a surface roughness greater than equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while said magnetic disk is rotating, the protective layer being coated with a lubricant which contains at least one member selected from perfluoropolyether compounds expressed by the formulas (IV) to (VI) above, the lubricant being applied to the entire surface of the magnetic disk, the entire surface of the magnetic disk being heated above 80° C. or the entire surface of the magnetic disk or the data region being irradiated with ultraviolet rays, the surface of said protective film being coated all over the magnetic disk with a perfluoropolyether compound having adsorptive functional groups which is selected from the perfluoropolyether compounds expressed by the formulas (VII) to (XIII) above, the data region being subsequently washed with a perfluorocarbon solvent, and coating the data region with a perfluoropolyether compound having functional groups chemically reactive with the surface of the protective film which is selected from the perfluoropolyether compounds expressed by the formulas (IV) to (VI) above, such that the lubricating film formed in the CSS region has a thickness greater than equal to 1.5 nm and the lubricating film formed in the data region has a thickness greater than or equal to 1 nm.

The twentieth aspect of the present invention resides in a magnetic disk having a seed layer, a magnetic layer, a protective layer, and a lubricating layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated with a lubricant which contains at least one member selected from perfluoropolyether compounds expressed by the formulas (IV) to (XIII) above, the lubricant being applied to the entire surface of the magnetic disk, the entire surface of the magnetic disk being heated above 80° C. or the entire surface of the magnetic disk or the data region being irradiated with ultraviolet rays, the CSS region being subsequently washed with a perfluorocarbon solvent, such that the lubricating film formed in the CSS region has thickness greater than or equal to 1.5 nm and the lubricating film formed in the data region has a thickness greater than or equal to 1 nm.

The twenty-first aspect of the present invention resides in a process for producing a magnetic disk having a seed layer, a magnetic layer, a protective layer, and a lubricating layer sequentially laminated on a non-magnetic substrate, said process comprising forming a CSS region having a protective layer with a surface roughness greater than or equal to Ra 10 nm at the place where the magnetic head slider is positioned when the magnetic disk starts and stops rotating, forming a data region having a protective layer with a surface roughness smaller than or equal to Ra 3 nm at the place where the magnetic head slider is positioned while the magnetic disk is rotating, coating the surface of the protective layer all over the magnetic disk with a lubricant which contains at least one member selected from perfluoropolyether compounds expressed by the formulas (IV) to (XIII) above, heating the entire surf ace of the magnetic disk above 80° C. or irradiating the entire surface of the magnetic disk or the data region with ultraviolet rays, and washing the entire surface of the magnetic disk with a perfluorocarbon solvent, and coating the CSS region with a perfluoropolyether compound having adsorptive functional groups which is selected from the perfluoropolyether compounds expressed by the formulas (VII) to (XIII) above, such that the lubricating film formed in the CSS region has a thickness greater than or equal to 1.5 nm and the lubricating film formed in the data region has a thickness greater than or equal to 1 nm.

The twenty-second aspect of the present invention resides in a process for producing a magnetic disk having a seed layer, a magnetic layer, a protective layer, and a lubricating layer sequentially laminated on a non-magnetic substrate, said process comprising forming a CSS region having a protective layer with a surface roughness greater than or equal to Ra 10 nm at the place where the magnetic head slider is positioned when the magnetic disk starts and stops rotating, forming a data region having a protective layer with a surface roughness smaller than or equal to Ra 3 nm at the place where the magnetic head slider is positioned while the magnetic disk is rotating, coating the surface of the protective layer all over the magnetic disk with a lubricant which contains at least one member selected from perfluoropolyether compounds expressed by the formulas (IV) to (XIII) above, heating the entire surface of the magnetic disk above 80° C. or irradiating the entire surface of the magnetic disk or the data region with ultraviolet rays, and washing the entire surface of the magnetic disk with a perfluorocarbon solvent, and coating the data region with a perfluoropolyether compound having functional groups chemically reactive with the surface of the protective layer which is selected from the perfluoropolyether compounds expressed by the formulas (IV) to (VI) above, such that the lubricating film formed in the CSS region has a thickness greater than or equal to 1.5 nm and the lubricating film formed in the data region has a thickness greater than or equal to 1 nm.

The twenty-third aspect of the present invention resides in a process for producing a magnetic disk having a seed layer, a magnetic layer, a protective layer, and a lubricating layer sequentially laminated on a non-magnetic substrate, said process comprising forming a CSS region having a protective layer with a surface roughness greater than or equal to Ra 10 nm at the place where the magnetic head slider is positioned when the magnetic disk starts and stops rotating, forming a data region having a protective layer with a surface roughness smaller than or equal to Ra 3 nm at the place where the magnetic head slider is positioned while the magnetic disk is rotating, coating the surface of the protective layer all over the magnetic disk with a lubricant which contains at least one member selected from perfluoropolyether compounds having functional groups chemically reactive with the surface of the protective film expressed by the formulas (IV) to (VI) above, heating the entire surface of the magnetic disk above 80° C. or irradiating the entire surface of the magnetic disk with ultraviolet rays, coating the entire surface of the magnetic disk wit h a perfluoropolyether compound having adsorptive functional groups which is selected from perfluoropolyether compounds expressed by the formulas (VII) to (XIII), and washing the data region with a perfluorocarbon solvent, and coating with a perfluoropolyether compound having functional groups chemically reactive with the surface of the protective layer which is selected from the perfluoropolyether compounds expressed by the formulas (IV) to (VI) above, such that the lubricating film formed in the CSS region has a thickness greater than or equal to 1.5 nm and the lubricating film formed in the data region has a thickness greater than or equal to 1 nm.

The twenty-fourth aspect of the present invention resides in a magnetic recording/reproducing device comprising a magnetic head, a magnetic head slider carrying the magnetic head, and a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated with a lubricating film which contains at least one member selected from perfluoropolyether compounds expressed by the formulas (IV) to (XIII) above, subsequently the entire surface of the magnetic disk is heated above 80° C. or the entire surface of the magnetic disk or the data region is irradiated with ultraviolet rays, and the data region is washed with a perfluorocarbon solvent, such that the lubricating film formed in the CSS region has a thickness greater than or equal to 1.5 nm and the lubricating film formed in the data region has a thickness greater than or equal to 1 nm, and the limiting static friction and dynamic friction that occur in the data region between the magnetic head slider and the magnetic disk are smaller than or equal to 1.5 and 1.0, respectively, and the limiting static friction and dynamic friction that occur in the CSS region between the magnetic head slider and the magnetic disk are smaller than or equal to 1.0 and 0.5, respectively.

The twenty-fifth aspect of the present invention resides in a magnetic recording/reproducing device composed of a magnetic head, a magnetic head slider carrying the magnetic head, and a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated with a lubricating film which contains at least one member selected from perfluoropolyether compounds expressed by the formulas (IV) to (XIII) above, subsequently the entire surface of the magnetic disk is heated above 80° C. or the entire surface of the magnetic disk or the data region is irradiated with ultraviolet rays, and the entire surface of the magnetic disk is washed with a perfluorocarbon solvent, the CSS region is coated with a perfluoropolyether compound having adsorptive functional groups which is selected from the perfluoropolyether compounds expressed by the formulas (VII) to (XIII) above, such that the lubricating film formed in the CSS region has a thickness greater than or equal to 1.5 nm and the lubricating film formed in the data region has a thickness greater than or equal to 1 nm, and the limiting static friction and dynamic friction that occur in the data region between the magnetic head slider and the magnetic disk are smaller than or equal to 1.5 and 1.0, respectively, and the limiting static friction and dynamic friction that occur in the CSS region between the magnetic head slider and the magnetic disk are smaller than or equal to 1.0 and 0.5, respectively.

The twenty-sixth aspect of the present invention resides in a magnetic recording/reproducing device composed of a magnetic head, a magnetic head slider carrying the magnetic-head, and a magnetic disk having a seed layer, a magnetic layer, and a protective layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk rotating, the protective layer being coated all over the magnetic disk with at least one member selected from perfluoropolyether compounds expressed by the formulas (IV) to (XIII) above, subsequently the entire surface of the magnetic disk being heated above 80° C. or the entire surface of the magnetic disk or the data region being irradiated with ultraviolet rays, and the data region being washed with a perfluorocarbon solvent, the data region being coated with a perfluoropolyether compound having functional groups chemically reactive with the surface of the protective film which is selected from the perfluoropolyether compounds expressed by the formulas (IV) to (VI) above, such that the lubricating film formed in the CSS region has a thickness greater than 1.5 nm and the lubricating film formed in the data region has a thickness greater than 1 nm, and the limiting static friction and dynamic friction that occur in the data region between the magnetic head slider and the magnetic disk are smaller than or equal to 1.5 and 1.0, respectively, and the limiting static friction and dynamic friction that occur in the CSS region between the magnetic head slider and the magnetic disk are smaller than or equal to 1.0 and 0.5, respectively.

The twenty-seventh aspect of the present invention resides in a magnetic recording/reproducing device composed of a magnetic head, a magnetic head slider carrying the magnetic head, and a magnetic disk having a seed layer, a magnetic layer, a protective layer, and a lubricating layer sequentially laminated on a non-magnetic substrate, characterized in that the disk has a CSS region and a data region, the CSS region having a protective layer with a surface roughness greater than or equal to Ra 10 nm at the place where the magnetic head slider is positioned when the magnetic disk starts and stops rotating, the data region having a protective layer with a surface roughness smaller than or equal to Ra 3 nm at the place where the magnetic head slider is positioned while the magnetic disk is rotating, the protective layer being coated all over the magnetic disk with at least one member selected from perfluoropolyether compounds having functional groups chemically reactive with the protective layer, expressed by the formulas (IV) to (VI) above, subsequently the entire surface of the magnetic disk being heated above 80° C. or irradiated with ultraviolet rays, the entire surface of the magnetic disk being coated with a perfluoropolyether compound having adsorptive functional groups selected from the perfluoropolyether expressed by the formulas (VII) to (XIII) above, and the data region being washed with a perfluorocarbon solvent, the data region being coated with a perfluoropolyether compound having functional groups chemically reactive with the surface of the protective film which is selected from the perfluoropolyether compounds expressed by the formulas (IV) to (VI) above, such that the lubricating film formed in the CSS region has a thickness greater than or equal to 1.5 nm and the lubricating film formed in the data region has a thickness greater than or equal to 1 nm, and the limiting static friction and dynamic friction that occur in the data region between the magnetic head slider and the magnetic disk are smaller than or equal to 1.5 and 1.0, respectively, and the limiting static friction and dynamic friction that occur in the CSS region between the magnetic head slider and the magnetic disk are smaller than or equal to 1.0 and 0.5, respectively.

The twenty-eighth aspect of the present invention resides in the magnetic disk as defined in the first aspect which has a diameter smaller than or equal to 88.9 mm.

The twenty-ninth aspect of the present invention resides in the magnetic disk as defined in the seventh aspect which has a diameter smaller than or equal to 88.9 mm.

The thirtieth aspect of the present invention resides in the magnetic disk as defined in the eleventh aspect which has a diameter smaller than or equal to 88.9 mm.

According to the present invention, the CSS region has a lubricating layer which is composed of a firmly fixed lubricant and a weakly fixed lubricant so as to ensure good durability, and the data region has a lubricating layer composed mainly of a firmly fixed lubricant so as to reduce stiction. The lubricating layer (of weakly fixed lubricant) in the data region needs to have a certain thickness so that it endures contact sliding that might accidentally occur in the data region as a result of reduction in the flying height of the head. To this end, it is necessary not only to select a lubricant having reactive or adsorptive functional groups or to increase the thickness of the layer of the firmly fixed lubricant by heating or UV treatment, but also to coat the data region twice. Conversely, the CSS region is coated with the lubricant twice if the weakly fixed lubricant is small in amount. The lubricating layer constructed in this manner permits the data region and the CSS region to exhibit satisfactory sliding performance required of a reliable magnetic disk and magnetic disk apparatus.

BEST MODE FOR CARRYING OUT THE INVENTION

Figure 1A:
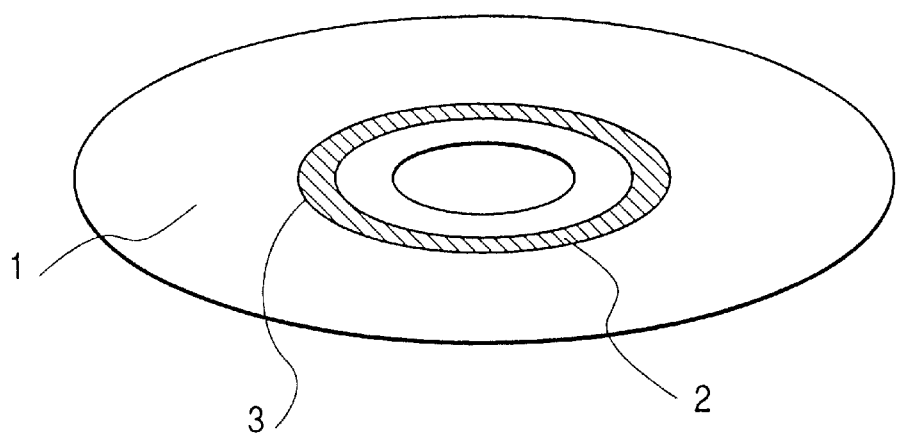
FIG. 1(a) is a perspective view showing the magnetic disk prepared in Example 1 of the present invention and FIG. 1(b) is a sectional view showing the boundary between the CSS region and the data zone.

The invention will be described in more detail with reference to the following examples, which are not intended to restrict the scope of the invention.

Example 1

A substrate of aluminum alloy (3.5 inches in diameter) with its surface mirror-finished was coated by sputtering sequentially with an NiP seed layer (10 $\mu$m thick), a Cr layer (0.5 $\mu$m thick), a Co—Cr-Pt layer (60 nm thick), and a carbon protective layer (20 nm thick), to produce a magnetic disk. The region (15–20 mm in radius) of this magnetic disk underwent electrostatic coating with fluorinated resin particles (0.5 $\mu$m in diameter). The entire surface of the magnetic disk underwent etching (10 nm deep) with oxygen. The fluorinated resin particles were removed by water washing. In this way there were formed uniformly cylindrical protuberances (0.5 μm in diameter) in the region covering the radius from 15 to 20 mm. In this region was formed a CSS region having a center line average roughness of Ra 15 nm, and in another region was formed a smooth data region having a center line average roughness of Ra 1.2 nm.

Next, the magnetic disk was dipped (for coating) in a solution (1) containing in a fluoride-containing solvent ("PF5052" from Sumitomo 3M Limited) 0.01 wt % of perfluoropolyether compound expressed by the formula (IV) below.

$$F(CF_2CF_2CF_2O)_n-C_2F_4-CONH-C_3H_6-Si(OC_2H_5)_3 \quad (IV)$$

The conditions of dip coating are as follows.
Dip rate in the solution: 10 mm/s
Residence time in the solution: 180 s
Raising rate from the solution: 2.5 mm/s After complete drying, the coated magnetic disk was heated at 100° C. for 2 hours. This heat treatment causes the perfluoropolyether compound (IV) to chemically react with the surface of the protective layer and hence to firmly fix to the surface of the magnetic disk. Subsequently, the magnetic disk was dipped (for coating) in the same manner as mentioned above) in a solution (2) containing in a fluoride-containing solvent ("PF5052" from Sumitomo 3M Limited) 0.001 wt % of perfluoropolyether compound expressed by the formula (XI) below.

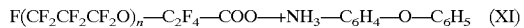

$$F(CF_2CF_2CF_2O)_n-C_2F_4-COO-+NH_3-C_6H_4-O-C_6H_5 \quad (XI)$$

After complete drying, the data region of the coated magnetic disk was washed with the above-mentioned fluoride-containing solvent. This washing was accomplished by jetting the solvent (50 ml/min) to the data region while turning the disk (1000 rpm) by means of a spinner. (An alternative washing method is by turning the disk, with the data region dipped in the solvent.)

Figure 1B:
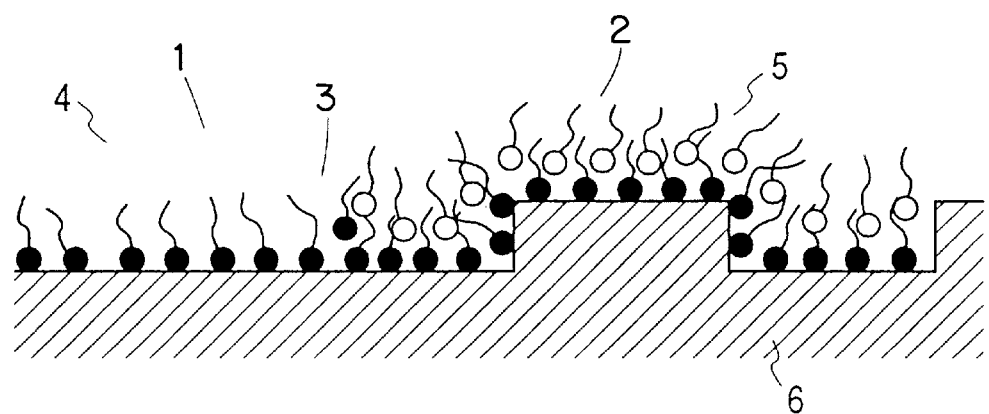

The thus obtained magnetic disk has in the CSS region a lubricating layer which has chemically reacted with the surface of the disk. This lubricating layer is composed of a firmly fixed layer and a weakly fixed layer of perfluoropolyether compound (XI). In addition, the magnetic disk has in the data region a firmly fixed lubricating layer composed almost entirely of perfluoropolyether compound (IV). The lubricating layers in the data region and CSS region have a thickness of 2.2 nm and 2.7 nm, respectively. FIG. 1(a) shows the external appearance of the magnetic disk prepared in this example. FIG. 1(b) is a sectional view showing the boundary 3 between the CSS region and the data region.

Figure 2A:
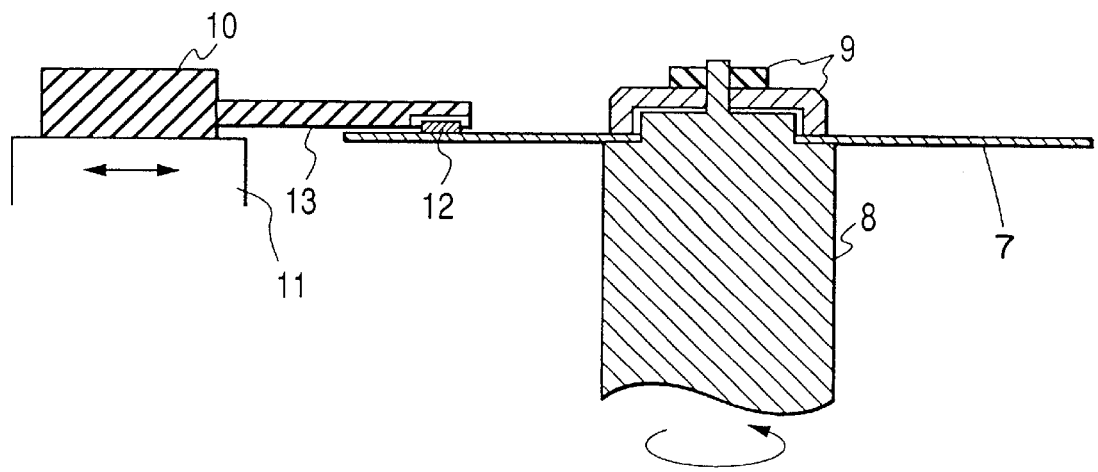
FIG. 2(a) is a sectional view.
Figure 2B:
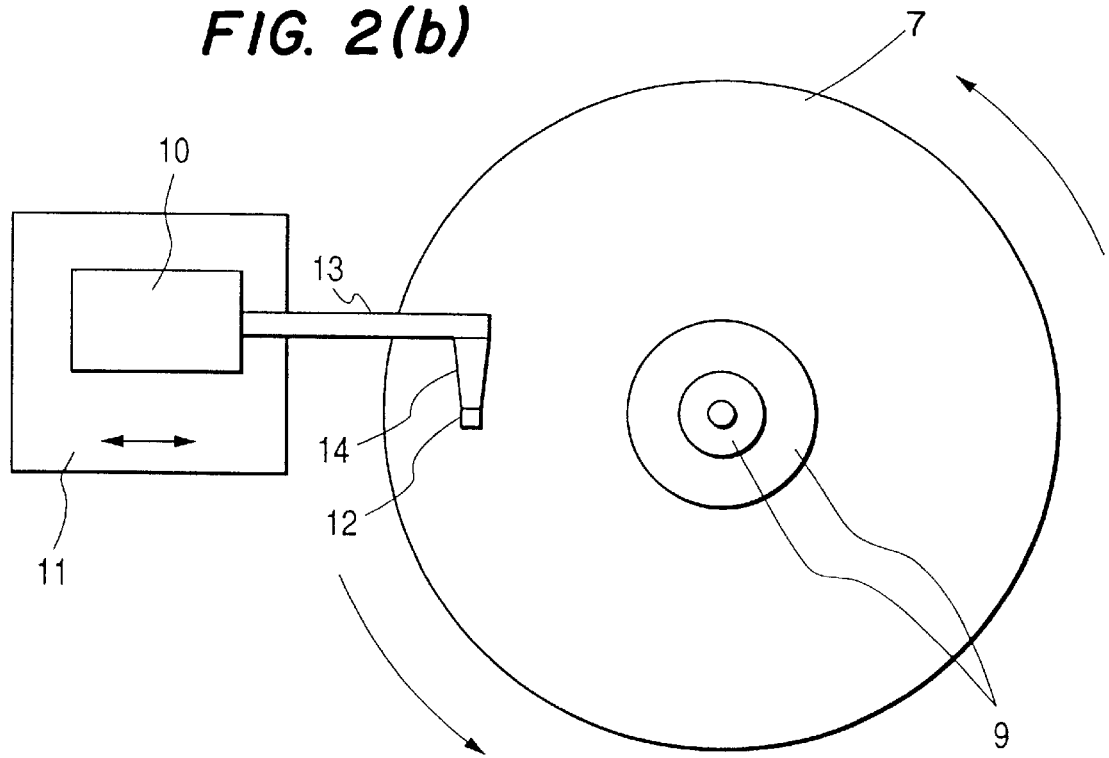
FIG. 2(b) is a top view of the apparatus used for a CSS test and stiction test.

The sputtered magnetic disk underwent a contact-start-stop (CSS) test and a stiction test under the following conditions using the apparatus shown in FIG. 2(a).

The magnetic disk 7 for measurement is attached (and fixed by the disk presser 9) to the spindle 8 which is directly connected to the motor placed at the bottom of the apparatus. The head slider 12 is of the in-line type (20T made of $Al_2O_3TiC$), with its rail surface coming into contact in the disk-rotating direction. The head slider 12 is fixed to the arm 13 which is connected to the load cell 10. The load cell 10 is fixed to the stage 11 which is movable in the radial direction, so that evaluation for each track is possible. The load cell 10 measures the frictional force that occurs between the head slider 12 and the magnetic disk 7 during rotation.

For CSS evaluation, start and stop operations of the disk were repeated (up to 100,000 times) at short intervals. After CSS cycles of 1, 50, 100, 500, 1000, 5000, 10000, and integral multiples of 10000, the disk was stopped, the head was allowed to be in contact with the disk for 2 seconds, and the disk was turned at 10 rpm. The maximum dynamic friction at that time was measured. Also, the number of CSS for disk crash to occur was counted. Disk crash is defined as the state in which the carbon protective layer (as the undercoat of the lubricating layer) is completely worn and the magnetic layer is exposed. Crash gives a visible wear scar. The experiment was suspended when crash occurred. In the case where disk crash occurred within 100,000 cycles, the maximum dynamic friction force is expressed by the maximum dynamic friction coefficient measured up to the CSS cycles before disk crash. The maximum speed of the disk is 5400 rpm and the head load is 3.0 g. The disk was run for 20 hours, with the head flying (because, the head is usually in the flying state in the data region). In anticipation of an accidental disk stop, the disk was stopped at certain intervals (4, 8, 12, 16, and 20 hours after the start of experiment). As in the case of measurement in the CSS region, the head was brought into contact for 2 seconds and then the disk was run at 10 rpm, and the maximum dynamic friction force was measured. The disk surface was inspected for a wear scar, and the experiment was suspended as soon as a crash occurred.

Stiction was measured as follows. The head slider was kept in contact with the disk for 12 hours, the disk was rotated slowly. The limiting static friction that occurred immediately after rotation was measured. For measurement, in both the CSS region and data region, the load was 3.0 g and the disk speed was 1 rpm. The results of evaluation are shown in Table 1.

TABLE 1

| | CSS test | | | | Stiction test | |
|---|---|---|---|---|---|---|
| | CSS region | | Data region | | Limiting static friction (gf) | |
| | Max. dynamic friction force (gf) | CSS cycles up to crash | Max. dynamic friction force (gf) | Time up to occurence of wear scar (h) | CSS region | Data region |
| Example 1 | 1.86 | >100000 | 2.16 | >20 | 1.86 | 2.12 |
| Example 2 | 1.67 | >100000 | 2.38 | >20 | 1.95 | 2.36 |
| Example 3 | 1.49 | >100000 | 2.01 | >20 | 1.66 | 2.43 |
| Comparative Example 1 | 7.86 | 5000 | 3.12 | >20 | 1.35 | 2.31 |
| Comparative Example 2 | 1.82 | >100000 | 3.51 | >20 | 1.86 | 27.6 |

TABLE 1-continued

| | CSS test | | | | | |
| --- | --- | --- | --- | --- | --- | --- |
| | CSS region | | Data region | | Stiction test Limiting static friction (gf) | |
| | Max. dynamic friction force (gf) | CSS cycles up to crash | Max. dynamic friction force (gf) | Time up to occurence of wear scar (h) | CSS region | Data region |
| Comparative Example 3 | 1.62 | >100000 | 12.6 | 8 | 1.92 | 2.28 |
| Comparative Example 4 | 1.51 | >100000 | 2.95 | >20 | 1.69 | 32.8 |

Comparative Example 1 demonstrates the effect of coating the magnetic disk with the perfluoropolyether compound (IV) alone. Example 1 indicated a data region and CSS region which are satisfactory in the CSS test and stiction test, whereas Comparative Example 1 indicated a data region which is low in stiction and a CSS region which caused a disk crash in the CSS test. Comparative Example 2 demonstrates the effect of not performing washing on the data region after coating sequentially with the perfluoropolyether compound (IV) and the perfluoropolyether compound (XI). In this case, the CSS region was satisfactory, but the data region suffered strong stiction.

Example 2

Example 1 was repeated to prepare a magnetic disk by sputtering. The magnetic disk was dipped in a 0.005 wt % solution of the perfluoropolyether compound (VI) expressed by the formula (VI) below in the same fluoride-containing solvent as used in Example 1 under the same condition as in Example 1. Dipping was followed by heat treatment at 120° C. for 10 minutes, and the entire surface of the magnetic disk was washed with the same fluoride-containing disk as mentioned above. The lubricating layer has a thickness of 0.75 nm.

$(C_2H_5O)_3Si—C_3H_6—NHCO—(CF_2CF_2O)_m—(CF_2O)_n—CONH—C_3H_6—Si(OC_2H_5)_3$ (VI)

The fluorine-based lubricant (VIII) expressed by the formula (VIII) below was dissolved in the above-mentioned fluoride-containing solvent to give a 0.007 wt % solution.

$F(CF_2CF_2CF_2—O)_n—C_2F_4—CH_2OH$ (VIII)

This solution was applied in the same manner as in Example 1, and the data region alone was washed with the same fluoride-containing solvent as mentioned above. A 0.005 wt % solution of the above-mentioned perfluoropolyether compound (VI) was applied to the data region again by using the spinner. The thickness of the lubricating layers in the data region and CSS region was 1.96 rm and 1.84 nm, respectively.

The lubricating layer formed in this example was tested for CSS characteristics and stiction characteristics in the same manner as in Example 1. The results are shown in Table 1. This example is superior in both CSS characteristics and stiction characteristics to Comparative Example 3 in which the recoating of the perfluoropolyether compound (VI) was not performed. By contrast, Comparative Example 3 gave wear scars in the data region, although its result in the CSS zone is identical with that in this example. A probable reason for this that the head flies in the data zone, but the head comes into contact with the disk (because of low flying height) while the disk is rotating. The poor-results in Comparative Example 3 are due to the fact that the lubricating layer in the data region is not thick enough to maintain sufficient durability.

Example 3

Example 1 was repeated to prepare a magnetic disk by sputtering. The magnetic disk was dipped in a 0.005 wt % solution of the perfluoropolyether compound (XIII) expressed by the formula (XIII) below in the same fluoride-containing solvent as used in Example 1 under the same condition as in Example 1. Dipping was followed by heat treatment at 110° C. for 2 hours, and the entire surface of the magnetic disk was washed with the same fluoride-containing disk as mentioned above. The lubricating layer has a thickness of 0.8 nm.

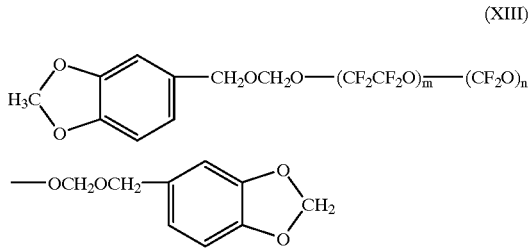

(XIII)

The perfluoropolyether compound (VII) expressed by the formula (VII) below was dissolved in the above-mentioned fluoride-containing solvent to give a 0.007 wt % solution.

$C_6H_5—O—C_6H_4—H_3N^+—OCO—(CF_2CF_2O)_m—(CF_2O)_n—COO—^+NH_3—C_6H_4—O—C_6H_5$ (VII)

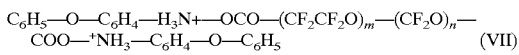

This solution was applied in the same manner as in Example 1, and the data region alone was heated at 1100C for. 2 hours and then washed with the same fluoride-containing solvent as mentioned above. The thickness of the layers in the data region and CSS region was 1.85 nm and 2.31 nm, respectively. The lubricating layer formed in this example was tested for CSS characteristics and stiction characteristics in the same manner as in Example 1. The results are shown in Table 1. This example is superior in both CSS characteristics and stiction characteristics to comparative Example 4 in which the washing of the data region was not performed after the application of the perfluoropolyether compound. By contrast, the CSS region in Comparative Example 4 is identical with that in this example, but strong stiction occurred in the data region.

Example 4

Figure 3:
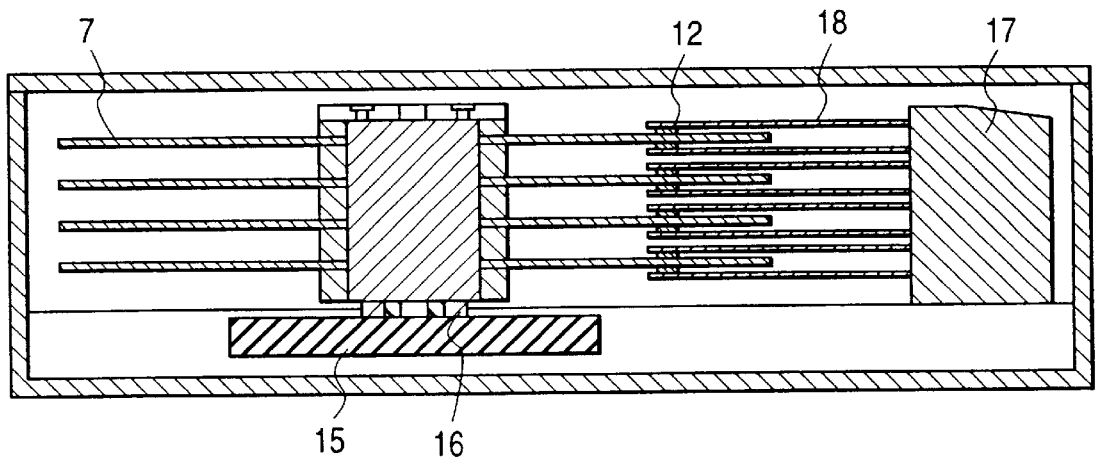
FIG. 3 is a sectional view of the magnetic recording/reproducing device pertaining to the embodiment of the present invention.

The magnetic disk prepared in Example 1 was mounted on a magnetic recording/reproducing device (for 3.5 inch disk) as schematically shown in FIG. 3. During running, the apparatus was deenergized so as to stop the head in the data region, and the apparatus was allowed to stand for 24 hours. On resumption, the magnetic disk permitted recording and reproducing normally. The same experiment as above was carried out with the magnetic disk prepared in Comparative Example 5. The apparatus could not restart due to strong stiction between the head slider and the disk in the data region.

Comparative Example 1

Example 1 was repeated to produce a magnetic disk by sputtering. The magnetic disk was dipped in a 0.01 wt % solution of the perfluoropolyether compound (IV) expressed by the formula (IV) below in a fluoride-containing solvent ("PF5052" from Sumitomo 3M Limited) under the same condition as in Example 1.

$$F(CF_2CF_2O)_n\text{—}C_2F_4\text{—}CONH\text{—}C_3H_6\text{—}Si(OC_2H_5)_3 \quad (IV)$$

Dipping was followed by complete drying and heat treatment at 110° C. for 2 hours. The thickness of the lubricating layer was 1.3 nm. The disk was tested for CSS characteristics and stiction characteristics in the same manner as in Example 1. The results are shown in Table 1.

Comparative Example 2

Example 1 was repeated to produce a magnetic disk by sputtering. The magnetic disk was dipped in a 0.01 wt % solution of the perfluoropolyether compound (IV) expressed by the formula (IV) below in a fluoride-containing solvent ("PF5052" from Sumitomo 3M Limited) under the same condition as in Example 1.

$$F(CF_2CF_2O)_n\text{—}C_2F_4\text{—}CONH\text{—}C_3H_6\text{—}Si(OC_2H_5)_3 \quad (IV)$$

Dipping was followed by complete drying and heat treatment at 100° C. for 2 hours. The magnetic disk was coated (by dipping in the same manner as in Example 1) with a 0.001 wt % solution of the perfluoropolyether compound (XI) expressed by the formula (XI) below in a fluoride-containing solvent ("PF5052" from Sumitomo 3M Limited) under the same condition as in

Example 1.

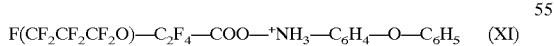

$$F(CF_2CF_2CF_2O)\text{—}C_2F_4\text{—}COO\text{—}^+NH_3\text{—}C_6H_4\text{—}O\text{—}C_6H_5 \quad (XI)$$

The lubricating layers in the data region and CSS region have a thickness of 2.7 nm. The disk was tested for CSS characteristics and stiction characteristics in the same manner as in Example 1. The results are shown in Table 1.

Comparative Example 3

Example 1 was repeated to produce a magnetic disk by sputtering. The magnetic disk was dipped in a 0.005 wt % solution of the perfluoropolyether compound (VI) expressed by the formula (VI) below (the same one as used in Example 1) in the same fluoride-containing solvent as used in Example 1 under the same condition as in Example 1.

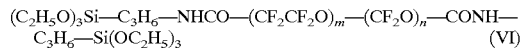

$$(C_2H_5O)_3Si\text{—}C_3H_6\text{—}NHCO\text{—}(CF_2CF_2O)_m\text{—}(CF_2O)_n\text{—}CONH\text{—}C_3H_6\text{—}Si(OC_2H_5)_3 \quad (VI)$$

Dipping was followed by heat treatment at 110° C. for 2 hours. The entire surface of the magnetic disk was washed with the same fluoride-containing solvent as above. Then, the magnetic disk was coated (by dipping in the same manner as in Example 1) with a 0.007 wt % solution of the perfluoropolyether compound (VII) expressed by the formula (VIII) below in the above-mentioned fluoride-containing solvent under the same condition as in Example 1.

$$F(CF_2CF_2CF_2\text{—}O)_n\text{—}C_2F_4\text{—}CH_2OH \quad (VIII)$$

The data region alone was washed with the same fluoride-containing solvent as mentioned above. The lubricating layers in the data region and CSS region have a thickness of 0.75 nm and 1.84 nm, respectively. The disk was tested for CSS characteristics and stiction characteristics in the same manner as in Example 1. The results are shown in Table 1.

Comparative Example 4

Example 1 was repeated to produce a magnetic disk by sputtering. The magnetic disk was dipped in a 0.005 wt % solution of the perfluoropolyether compound (XIII) expressed by the formula (XIII) below (the same one as used in Example 3) in the same fluoride-containing solvent as used in Example 1 under the same condition as in Example 1.

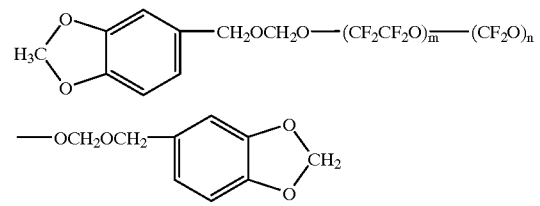

(XIII)

Dipping was followed by heat treatment at 110° C. for 2 hours. The entire surface of the magnetic disk was washed with the same fluoride-containing solvent as above. Then, the magnetic disk was coated (by dipping in the same manner as in Example 3) with a 0.007 wt % solution of the perfluoropolyether compound (VII) expressed by the formula (VII) below in the above-mentioned fluoride-containing solvent under the same condition as in Example 3.

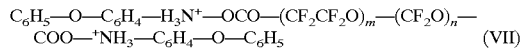

$$C_6H_5\text{—}O\text{—}C_6H_4\text{—}H_3N^+\text{—}OCO\text{—}(CF_2CF_2O)_m\text{—}(CF_2O)_n\text{—}COO\text{—}^+NH_3\text{—}C_6H_4\text{—}O\text{—}C_6H_5 \quad (VII)$$

The lubricating layers in the data region and CSS region have a thickness of 2.31 nm. The disk was tested for CSS characteristics and stiction characteristics in the same manner as in Example 1. The results are shown in Table 1.

Comparative Example 5

The magnetic disk prepared in Comparative Example 2 was mounted on the same magnetic recording/reproducing device as used in Example 1. The apparatus was deenergized during running, and the apparatus was allowed to stand for 24 hours. The magnetic disk could not restart due to strong stiction between the head slider and the disk in the data region where there is a large amount of weakly adsorbed lubricant.

What is claimed is:

1. A magnetic disk, comprising:
   a substrate;
   a magnetic layer provided over said substrate;
   a protective layer provided over said magnetic layer; and
   a lubricating layer provided on said protective layer;
   wherein said magnetic disk comprises a CSS region on which a head slider is positioned when said magnetic disk starts and stops rotating and a data region over which the head slider is positioned while said magnetic disk is rotating for recording or reproducing information on said data region;
   wherein said lubricating layer comprises at least a first lubricant and a second lubricant fixed to said protective layer, wherein said first lubricant is more firmly fixed to said protective layer than said second lubricant and wherein said lubricating layer in said CSS region comprises not less than 10% of said second lubricant and said lubricating layer in said data region comprises less than 10% of said second lubricant.

2. The magnetic disk according to claim 1, wherein said first lubricant chemically reacts with said protective layer.

3. The magnetic disk according to claim 1, wherein said lubricating layer includes at least one member selected from the group consisting of perfluoropolyether compounds expressed by the formulae (I) to (III) below,

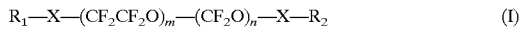  (I)

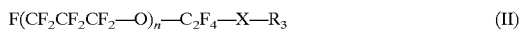  (II)

  (III)

wherein m and n are integers; $R_1$, $R_2$, $R_3$ and $R_4$ are hydrocarbon chains;
   and X is a divalent binding group.

4. The magnetic disk according to claim 1, wherein said first lubricant includes at least one member selected from the group consisting of perfluoropolyether compounds expressed by the formulae (IV) and (VI) below,

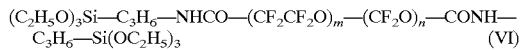  (VI)

  (IV)

and said second lubricant includes at least one member selected from the group consisting of perfluoropolyether compounds expressed by the formulae (VIII) and (XI) below,

  (VIII)

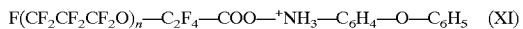  (XI)

where m and n are integers.

5. The magnetic disk according to claim 1, wherein the CSS region has a surface roughness greater than or equal to Ra 10 nm at the place where the magnetic head slider is positioned when the magnetic disk starts and stops rotating, and the data region has a surface roughness smaller than or equal to Ra 3 mn at the place where the magnetic head slider is positioned while the magnetic disk is rotating.

6. A method for producing a magnetic disk having a lubricating layer on a protective layer of the disk surface, a CSS region on which a head slider is positioned when the magnetic disk starts and stops rotating and a data region over which the head is positioned and performs recording and reproducing while the disk is rotating, comprising:
   carrying out the following steps (a), (b), and (c) in the data region; and
   carrying out the following steps (a) and (b) in the CSS region, where the steps (a), (b), and (c) are:
   (a): coating the disk surface with a lubricant
   (b): performing a heat treatment or UV treatment
   (c): washing the disk surface.

7. The method for producing a magnetic disk according to claim 6, comprising the steps of:
   carrying out the steps (a), and (b), over all of the disk surface; and then
   carrying out the step (a) over all the disk surface; and then
   carrying out the step only in the data region.

8. The method for producing a magnetic disk according to claim 7, wherein,
   the lubricant which is first coated over all the disk surface comprises a compound selected from the group consisting of perfluoropolyether compounds expressed by the formula (IV) below, and

  (IV), and
   the lubricant that is secondly coated all over the disk surface comprises a compound selected from the group consisting of perfluoropolyether compounds expressed by the formula (XI) below

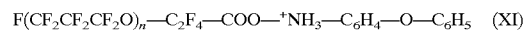  (XI)

where m and n are integers.

9. The method for producing a magnetic disk according to claim 6, comprising
   carrying out the steps (a), (b), and (c) over all of the disk surface; and then
   carrying out the step (a) over all of the disk surface; and then carrying out the step (c) and then (a) only in the data region.

10. The method for producing a magnetic disk according to claim 9, wherein
    the lubricant that is first coated over all of the disk surface comprises a compound selected from the group consisting of perfluoropolyether compounds expressed by the formula (VI) below,

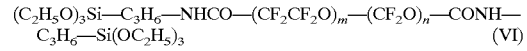  (VI)

the lubricant which is secondly coated over all of the disk surface comprises a compound selected from the group consisting of perfluoropolyether compounds expressed by the formula (VIII) below, and

  (VIII)

the lubricant that is thirdly coated only in the data region comprises a compound selected from the group consisting of perfluoropolyether compounds expressed by the formula (VI) below

$$C_3H_6-Si(OC_2H_5)_3 \tag{VI}$$

where m and n are integers.

11. The method for producing a magnetic disk according to claim 6, comprising carrying out the steps (a), (b), and (c) over all of the disk surface; and then carrying out the step (a) over all of the disk surface; and then carrying out the steps (b) and then (c) only in the data region.

12. The method for producing a magnetic disk according to claim 1, wherein, the lubricant that is first coated over all of the disk surface comprises a compound selected from the group consisting of perfluoropolyether compounds expressed by the formula (XIII) below,

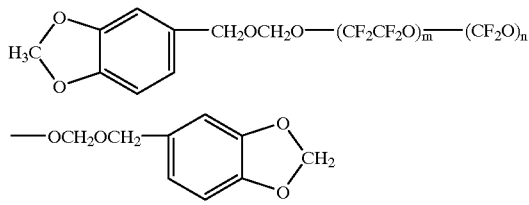
(XIII)

the lubricant that is secondly coated over all of the disk surface comprises a compound selected from the group consisting of perfluoropolyether compounds expressed by the formula (VII) below $$C_6H_5-O-C_6H_4-H_3N^+-OCO-(CF_2CF_2O)_m-(CF_2O)_n-COO-{}^+NH_3-C_6H_4-O-C_6H_5 \tag{VII}$$

where m and n are integers.

13. The method for producing a magnetic disk according to claim 6, further comprising drying the lubricant in the data region and the CSS region after the step (a).

14. The method for producing a magnetic disk according to claim 6, wherein the CSS region is formed to have a surface roughness greater than or equal to Ra 10 nm at the place where the magnetic head slider is positioned when the magnetic disk starts and stops rotating, and the data region is formed to have a surface roughness smaller than or equal to Ra 3 nm at the place where the magnetic head slider is positioned while the magnetic disk is rotating.

15. The method for producing a magnetic disk according to claim 6, wherein the step (c) is carried out with a perfluorocarbon solvent.

* * * * *